Patented Sept. 3, 1968

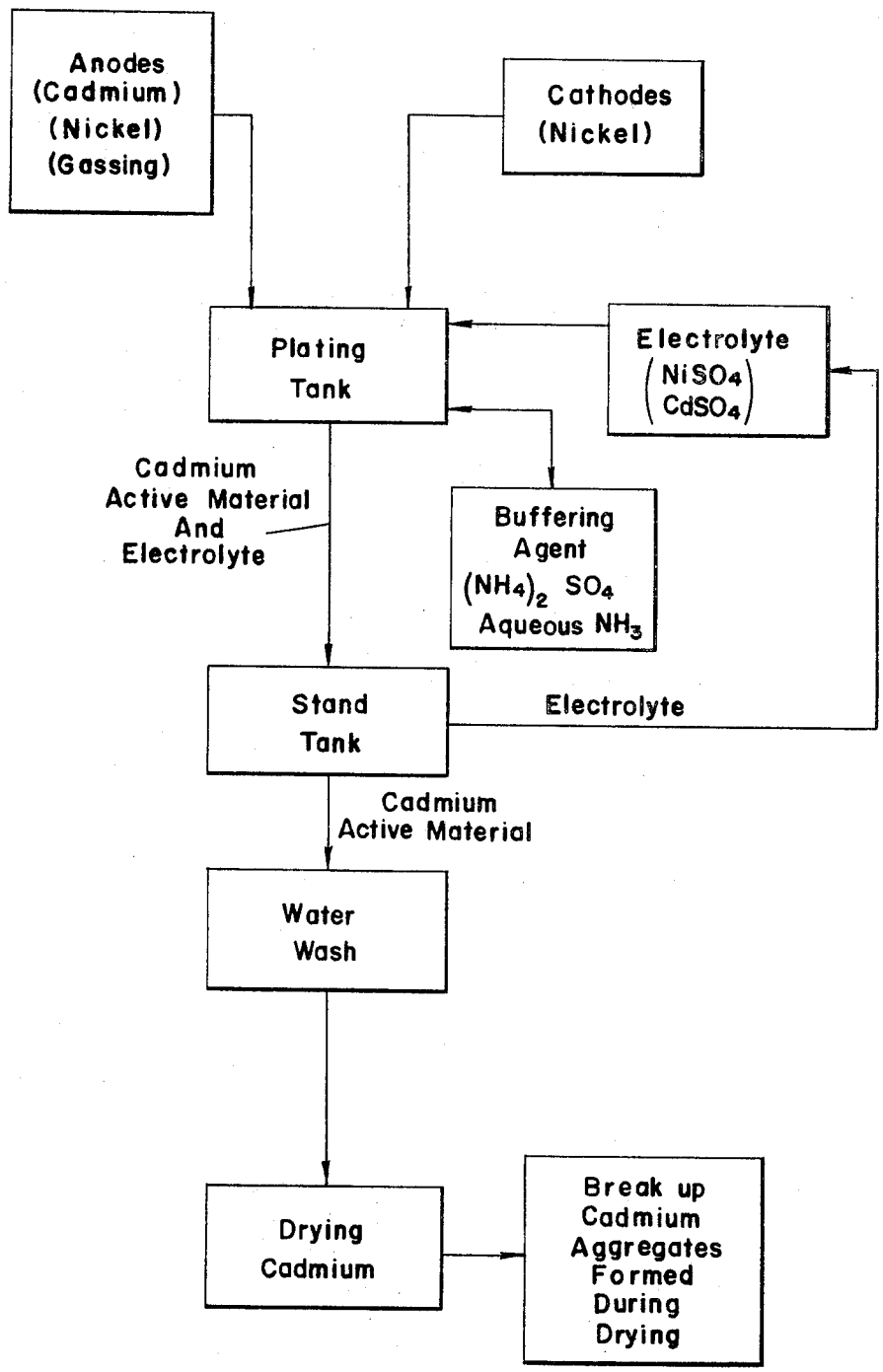

3,400,056
ELECTROLYTIC PROCESS FOR PREPARING
ELECTROCHEMICALLY ACTIVE CADMIUM
Stanley Hills, Cherry Hill, N.J., assignor to The Electric
Storage Battery Company, a corporation of New Jersey
Filed Aug. 26, 1964, Ser. No. 392,229
3 Claims. (Cl. 204—10)

ABSTRACT OF THE DISCLOSURE

Electrochemically active cadmium suitable for use in storage batteries is prepared. A loose and powderable cadmium deposit is prepared in an aqueous sulfate electrolyte containing cadmium sulfate, nickel sulfate, and a buffering agent. Three anodes are used, one being active cadmium, another being active nickel, and the third being an inactive gassing anode. Cadmium is electroplated onto the cathode at a current density of from 1 to 2 amps/square inch for a time corresponding to about 0.25 amp-hours/square inch; the pH of the electrolyte is from about 5 to about 8. The cadmium deposit is removed from the cathode, washed, dried, and recovered.

---

This invention relates to an electrolytic process for preparing electrochemically active cadmium. In particular, the invention relates to an electrolytic process for depositing a loose and powderable cadmium deposit which can be readily processed into an active material for electric storage batteries.

In the electric storage battery industry, cadmium is a very valuable and useful negative electrode active material. It is most often used in combination with nickel or silver positive electrodes and an alkaline electrolyte to provide high capacity electric storage batteries. Cadmium electrodes for use in high discharge rate batteries are generally prepared from cadimum oxide or hydroxide, uncharged forms of cadmium active material, which must be charged before they can be used to provide electrical power. The reason for using cadmium oxide or hydroxide instead of cadmium metal is that stable cadmium metal having sufficient electrochemical activity to be useful as a negative active material in a high discharge rate battery is very difficult to prepare.

Most of the currently practiced electrolytic processes which relate to electrorefining, electrowinning or electroplating metals are designed to obtain a coherent, hard and non-porous metallic deposit. Such processes are unsatisfactory for preparing electric storage battery cadmium active material which should be deposited as a loose and powderable metallic deposit in order that it can be easily removed and processed to battery active material having good electrochemical activity.

It is an object of this invention to provide an electrolytic process for preparing electric storage battery cadmium active material.

Another object of the invention is to provide an electrolytic process for preparing a loose and powderable cadmium deposit.

It is a further object of this invention to provide an electrolytic process for preparing electrochemically active cadmium which is stable and suitable for use as a negative active material in high discharge rate electric storage batteries.

Other objects and advantages of this invention will be apparent to those skilled in the art in view of the following description, and in particular, by reference to the drawing which is a flow diagram of a preferred embodiment of the electrolytic process for preparing electrochemically active cadmium.

It has been discovered that cadmium having sufficient electrochemical activity to be useful as negative active material in electric storage batteries can be prepared by an electrolytic process which is economically feasible. The electrolytic process of this invention provides a loose, powderable cadmium deposit which is readily removed and processed into negative active material. It has been found that the conditions essential for the electrolytic formation of a loose, powderable cadmium deposit are very high cathode current density, deposition of relatively small amounts of cadmium per unit area of cathode per run, codeposition of small amounts of nickel to increase the surface area, and a plating bath having a substantially neutral pH. In addition, in order to produce cadmium active material which is stable, it is essential to completely dry the cadmium deposit immediately after it is removed from the bath and washed so as to prevent its oxidation, or otherwise it must be stored in a non-oxidizing atmosphere.

The electrolytic process for preparing electric storage battery cadmium active material in accordance with this invention comprises several unit operations. Since this is an electrolytic process, it requires, anodes, cathodes and electrolyte and a source of electric current. In this particular process three types of anodes are used: cadmium anodes which supply the cadmium active material to be deposited on the cathodes, activated nickel anodes which supply nickel that is codeposited with the cadmium on the cathodes, and inactive anodes which function as gassing anodes to waste anodic current in order to equilibrate cathode and anode efficiencies and thereby permit substantially continuous operation. The cathodes upon which the active cadmium is deposited may be made of nickel or some other acid resistant metal, though nickel is generally preferred because of its relatively low cost. The electrolyte which is utilized in this process is an aqueous sulfate solution and contains both cadmium sulfate and nickel sulfate. In addition, the electrolyte also contains ammonium sulfate which increases the conductivity of the electrolyte and helps to maintain a substantially neutral pH. In order to economically produce cadmium metal which has sufficient electrochemical activity to be useful in batteries, it has been found that a very high cathodic current density must be used to ensure that a loose, powderable cadmium deposit is formed. In addition, only small amounts of cadmium per unit area of cathode can be deposited during each plating operation, for if the plating is prolonged to deposit large amounts of cadmium, the cadmium which is deposited densifies and no longer has sufficient electrochemical activity for use in electric batteries.

After the plating operation, the cadmium metal is removed from the cathodes, and since the cadmium deposit is loose and powderable, it is readily scraped from the cathodes. After the removal of the cadmium active material, it may be washed with distilled water to remove the electrolyte and then immediately dried to produce a stable and electrochemically active cadmium metal. During the drying operation, the finely divided cadmium active material tends to form aggregates which are broken up prior to using the cadmium metal to form battery electrodes. It is essential that the cadmium active material be maintained in a non-oxidizing atmosphere until it is completely dried, for it is highly pyrophoric and therefore is readily oxidized to cadmium oxide. It has been found that if care is taken in preventing this oxidation, a stable, electrochemically active cadmium material can be produced, and when used in electric batteries, it exhibits greater activity than the corresponding cadmium oxide. This was completely unexpected since the battery industry generally utilizes cadmium oxide instead of cadmium metal in manufacturing cadmium electrodes for electric batteries.

A better understanding of the essential features of this invention may be had by referring to the drawing which is a flow diagram of a preferred embodiment of the electrolytic process for preparing electrochemically active cadmium. It should be noted that this flow diagram illustrates only a preferred embodiment of the invention, and that one or more of the several operations may be altered and still be within the scope of this invention.

As shown in the drawing and as previously described, the electrolytic process of this invention requires three types of anodes. One set of anodes contains cadmium metal which is to be electrolytically deposited upon the cathode. This cadmium should be very pure, and commercially available cadmium which is 99.99% pure may be used. In order to increase the surface area of the cadmium active material which is deposited upon the cathodes, it is essential that nickel be codeposited with the cadmium. Nickel may be obtained in a form which is either active or inert in the processing conditions of this process. Activated nickel anodes which supply the nickel that is codeposited with the cadmium may be prepared from sulfur depolarized nickel which contains a small amount of sulfur to increase its electrochemical activity. The inactive anodes which function as gassing anodes may also be prepared from nickel, but this nickel is of the inert type. It is preferred to use pure nickel in the form of sintered nickel plaques as the gassing anodes. Other inert materials such as platinum or titanium may be used to prepare the gassing anodes, but nickel is preferred because of its relatively low cost. In selecting the nickel used to prepare the gassing anodes, one must be careful to select inert nickel which will not dissolve during the electrolytic process.

Since there are three types of anodes, the anodic electric current must be apportioned to the cadmium, active nickel and gassing electrodes. This is a matter of operator's choice and will vary depending upon the conditions existing during the plating operation. In general, it has been found that supplying 70% of the current to the cadmium anodes, 15% to the active nickel anodes and 15% to the gassing anodes will yield satisfactory results. Another problem which has been encountered during the plating operation is the tendency for the cadmium to plate out on the active nickel anode rather than on the nickel cathode. This problem has been overcome by placing the gassing anodes between the cadmium and active nickel anodes.

The size and shape of the anodes will vary depending upon the dimensions and configuration of the plate tank. It is particularly preferred to use a cylindrical plating tank with the anodes disposed along the outside perimeter of the tank. The anodes comprise small pieces of the respective anode metals contained in highly perforated titanium or inert nickel baskets. The baskets may be prepared from wire mesh or expanded metal so long as they are highly perforated to provide for good contact between the anode metal and the electrolyte. If the preferred cylindrical plating tank is used, the anode baskets will be curved so that they can be placed along the wall of the tank. The only restriction with respect to the size and shape of the anode metals which are placed in the baskets is that they fit into the baskets. As previously indicated, it is preferred that the cadmium and active nickel anodes be separated by the gassing anodes so as to decrease the likelihood of secondary plating on the active nickel anodes.

The cathode may be prepared from any metal which is inert and corrosion resistant in the electrolyte. Since nickel sheet meets these requirements and is relatively cheap, it is generally preferred to use a nickel cathode. If the plating tank has a cylindrical shape, the cathode will also have a cylindrical shape and will be placed so as to locate the anodes between the cathode and the plating tank wall. The cathode should be of such dimension as to hold the energy losses in the electrolyte to a minimum and yet be sufficiently spaced from the anodes as to be practical for carrying out the plating operation.

The electrolyte for the electrolytic deposition of cadmium in accordance with this invention comprises an aqueous solution of cadmium sulfate and nickel sulfate. The electrolyte is prepared by adding cadmium oxide to a sulfuric acid solution which reacts to form cadmium sulfate. Then nickel sulfate and ammonium sulfate are added to the bath solution. In addition, it may be necessary to add aqueous ammonia to neutralize the bath and bring it to the proper pH, in which case additional ammonium sulfate will be formed in the bath. It has been found that the ratio of cadmium to nickel in the electrolyte is critical and must be maintained at about 10 to 1. In addition, the concentration of cadmium in the electrolyte should be at least about 10 grams per liter of electrolyte and is preferably at least about 20 grams per liter of electrolyte. Consequently, the minimum nickel concentration should be at least about 2 grams per liter and preferably about 3 grams per liter of electrolyte. In addition, the electrolyte also contains ammonium sulfate which improves the conductivity of the electrolyte and helps to maintain a substantially neutral pH. It has been found that ammonium sulfate additions ranging from about 0.5 to about 0.8 molar will yield satisfactory results, though this may vary depending upon operating conditions. It has been determined that a pH between about 5 and 8 is satisfactory for carrying out the electrolytic deposition of cadmium in accordance with this invention.

The electrolytic deposition of cadmium in the form of a loose and powderable deposit must be carefully controlled in order to produce a cadmium metal having sufficient electrochemical activity for use as electric storage battery electrodes. One of the most critical factors in carrying out this process is the cathode current density. It has been found that the cathode current density must be at least 1 ampere per square inch of cathode plating area in order to get a good cadmium deposit and to operate economically. If the cathode current density is less than about 1 ampere per square inch, the plating rate is too low and the process is not economically feasible.

This electrolytic process may be carried out in either an unagitated bath operation or in an agitated bath operation. Generally, the cathode current density can be much lower in the unagitated bath operation and current densities ranging from about 1 to about 2 amperes/in.$^2$ of cathode have been found to be satisfactory. In an agitated bath operation it has been determined that the cathode current density must be greatly increased and current densities ranging from about 20 to about 30 amperes/in.$^2$ have been found to be more satisfactory. Cathode current densities greater than those recommended above tend to increase gassing to the point where the process becomes too inefficient to be economically feasible.

In addition to the criticality of the cathode current density, the amount of cadmium deposited per unit area of cathode was found to be very critical. The deposition should be limited to an amount corresponding to about 0.25 ampere hour per square inch of unplated cathode, which corresponds to a plating time of 7.5 minutes per plating operation at the recommended cathode current density of 2 amperes/in.$^2$. If greater amounts of cadmium are deposited, the deposit tends to densify and the electrochemical activity of the cadmium is impaired. It is apparent that deposition of lesser amounts could be carried out, but this would render the process economically unfeasible because of the very short operating time per run. It is also apparent that because of the much greater cathode current densities required for an agitated bath operation, that the plating time is very short and that such an operation is more difficult and expensive to maintain. Therefore, it is particularly preferred to carry out the electrolytic deposition of cadmium in an unagitated bath.

In the process illustrated in the drawing, the cadmium active material is removed from the cathode by scraping it therefrom in the plating tank and allowing it to settle to the bottom of the tank. This manner of removing the cadmium active material within the plating tank is readily carried out because the loose, powderable cadmium deposit is easily removed from the cathode. After the cadmium active material is scraped from the cathode, it settles to the bottom of the plating tank and is then pumped to a stand tank where it is allowed to separate from the electrolyte. This procedure has several advantages. One of the advantages is that the cathode does not have to be removed from the plating tank. In addition, this procedure reduces the opportunity for the cadmium active material to contact an oxidizing medium and therefore facilitates the production of a stable cadmium active material. It will be apparent to those skilled in the art that this particular method of operation is not critical to this invention and that other methods may be used, such as removing the cathode from the plating tank and removing the cadmium active material in a separate operation.

Most of the active material which is scraped off of the cathode in the plating tank will settle to the bottom of the plating tank. The cadmium active material plus some electrolyte is pumped from hte bottom of the plating tank to a stand tank where the active material separates from the electrolyte and settles to the bottom. The clear electrolyte at the top of the stand tank can be circulated back into the plating tank, for this electrolyte circulation will aid in the homogenization of the electrolyte in the plating tank. A convenient method for carrying this out is to have the stand tank at a higher level than the plating tank, and clear electrolyte from the top of the stand tank can be gravity fed back into the plating tank. A particularly preferred method of operation would be to have two plating tanks and one stand tank for the recovery of active material from the plating tanks which would operate consecutively and thereby keep a relatively steady flow of active material to the stand tank. In this manner, electrolyte dragout losses would be minimized by recovery of the active material without the necessity of removing the cathode from the plating tank.

After the cadmium active material is separated in the stand tank, it is moved to a washing tank where it is washed with a large volume of distilled water. This washing procedure can be carried out by stirring the cadmium active material for approximately 5 minutes in a large volume of distilled water, allowing the suspended active material to settle, decanting and repeating this washing process several times. This washing procedure is not critical but is desirable since it removes electrolyte from the cadmium active material and thereby improves the stability of the cadmium metal.

In order to produce a cadmium active material which is stable, the cadmium must be completely dried before it can be permitted to come into contact with an oxidizing atmosphere for sufficient time to cause substantial oxidation of the cadmium. As previously mentioned, the cadmium active material is highly pyrophoric and must be handled with great care to prevent its oxidation. It has been found that cadmium active material which is prepared in such a manner as to minimize oxidation has superior electrochemical activity as compared to cadmium active material which has been substantially oxidized.

One method for drying the cadmium active material which is economically feasible is to use a vacuum oven. The vacuum oven is initially held at about room temperature through heat is supplied to evaporate the water, with the water vapor being evacuated by a vacuum pump. Substantial amounts of water can be removed in this manner. The complete drying of the cadmium under vacuum is essential. The danger of oxidation is greatest when most of the water has been removed but the cadmium is still moist. Therefore, the temperature of the vacuum oven may be increased above room temperature in order to remove the last traces of water from the cadmium, through this must be done in a vacuum to prevent oxidation. In addition, the dry cadmium must be returned to room temperature under vacuum.

During the drying process, the cadmium active material tends to form aggregates which impairs the flow properties of the cadmium and makes it difficult to spread the cadmium evenly during electrode fabrication. A rapid method for overcoming this problem is to pass the cadmium active material through a mesh screen, such as approximately 20 mesh, which breaks up the aggregates formed in the drying process.

The following examples will illustrate preferred embodiments of the electrolytic preparation of electrochemically active cadmium in accordance with this invention.

Example I

Electrochemically active cadmium metal was electrolytically deposited upon an inert nickel sheet cathode in an unagitated electrolyte bath. The electrolyte comprised an aqueous solution of cadmium sulfate ($CdSO_4$) and nickel sulfate ($NiSO_4$) in which the initial cadmium concentration was 24.5 g./l. and the initial nickel concentration was 2.34 g./l. The initial electrolyte pH was 5.8 and the 0.6 mole of ammonium sulfate per liter of electrolyte helped to maintain the electrolyte pH at about 5.7 throughout the plating operation. The total electrolyte volume was one liter.

Three types of anodes were used. There were two cadmium anodes, two inert nickel sheet anodes which functioned as gassing electrodes, and two activated sulfur depolarized nickel anodes. The sulfur depolarized nickel anodes were activated by giving them a one minute dip into hot (80° C.) 1:1 HCl. The activated anodes were carefully washed with distilled water before placing them into the electrolyte in order to minimize the introduction of chloride ions into the bath which would activate the inert gassing anodes and inhibit their gassing function.

The total current passed to the cathode was 4 amperes which resulted in a cathode current density of 2 amps/in.$^2$. The current was apportioned to the cadmium, active nickel and gassing anodes on a 70%, 15% and 15% basis respectively. This yielded the following anode current densities: cadmium —0.7 amp/in.$^2$; active nickel —0.06 amp/in.$^2$; gassing anode —0.3 amp/in.$^2$.

The electrodeposition of cadmium was carried out for a period of time equivalent to 0.25 ampere-hour per square inch of cathode. The active cadmium metal which was deposited on the cathode sheet was loose and easily removed and powdered. Then the active cadmium was consecutively washed with alcohol and acetone in order to dry it rapidly. During the drying process, the active cadmium formed aggregates which were broken up by passing them through a flour sifter having a 20 mesh screen. The resulting product was light gray in color and had good electrochemical activity. When tested as a negative electrode; one ampere-hour of capacity required 2.8 grams of cadmium as compared to 3.7 grams cadmium for standard pressed cadmium oxide powder.

Example II

Electrochemically active cadmium was electrolytically deposited in a manner similar to that described in Example I. The aqueous sulfate electrolyte contained 24 g./l. of cadmium and 2.3 g./l. of nickel. The initial electrolyte pH was 5.6 and the pH was always maintained above 5. The distribution of the current on the anodes was different, and in this operation, the cadmium anodes carried 65% of the current giving a 0.65 amp/in.$^2$ current density and the gassing anodes carried 20% giving them a 0.4 amp/in.$^2$ current density.

The electrodeposition of cadmium was carried out for a period of time equivalent to 0.25 ampere-hour per square inch of cathode. The resulting product had a light gray color and good electrochemical activity. When tested as a negative electrode active material it yielded one ampere-hour per 2.8 grams of cadmium.

Example III

Electrochemically active cadmium metal was also electrolytically deposited from an agitated bath. The bath was subjected to medium agitation by means of a magnetic stirrer. The equipment used in Examples I and II was also used in this electrolytic deposition from an agitated bath, with the exception that no gassing anode was used. The electrolyte comprised an aqueous solution of cadmium sulfate and nickel sulfate in which the concentration of cadmium was 23.7 grams/liter and the initial nickel concentration was 2.48 grams/liter. The electrolyte pH was 6.25.

The total current passed to the cathode was 20 amperes, and since a one square inch cathode was used, the cathode current density was 20 amps/in.$^2$. The current was apportioned to the cadmium and nickel anodes on a 60% and 40% basis respectively. This yielded a cadmium anode current density of 3 amps/in.$^2$ and a nickel anode current density of 0.8 amp/in.$^2$.

The electrodeposition of cadmium was carried out for a period of time equivalent to 0.25 ampere-hour/in.$^2$ of cathode, which required only 45 seconds. The resulting product had good electrochemical activity and was a light gray color. When tested as a negative electrode active material it yielded one ampere-hour per 2.95 grams of cadmium. In order to operate continuously, gassing anodes would be required.

The electrolytic process of this invention is particularly designed for substantially continuous operation when using an unagitated bath. In order to make the process economically feasible, it is essential that it be capable of continuous operation, for the cost of a batch process would be prohibitive. For this reason, an unagitated bath is preferred. The cadmium active material prepared in accordance with this invention may be used to make various types of storage battery electrodes such as pressed powder electrodes and pocket filled electrodes.

Having completely described this invention, what is claimed is:

1. An electrolytic process for preparing electrochemically active cadmium which comprises:
    (a) preparing an aqueous sulfate electrolyte containing cadmium sulfate and nickel sulfate in sufficient concentration to provide a cadmium concentration of at least about 20 grams per liter of electrolyte with the ratio of cadmium to nickel of about 10 to 1, said electrolyte containing a buffering agent to aid in maintaining the pH in the range of about 5 to about 8;
    (b) inserting anodes and a cathode in said electrolyte, the anodes comprising cadmium anodes, activated nickel anodes and inactive gassing anodes;
    (c) electroplating cadmium on said cathode at a cathode current density of at least about 1 ampere/in.$^2$ of cathode, continuing said electroplating for a time corresponding to about 0.25 ampere-hour/in.$^2$ of unplated cathode;
    (d) removing the cadmium active material from the cathode;
    (e) washing and drying said cadmium active material in such a manner as to prevent its oxidation; and
    (f) recovering a stable cadmium metal which has good electrochemical activity when used to prepare electric storage battery electrodes.

2. An electrolytic process for preparing electrochemically active cadmium which comprises:
    (a) preparing an aequous sulfate electrolyte containing cadmium sulfate and nickel sulfate in sufficient concentration to provide a cadmium concentration ranging from about 20 to about 30 grams per liter of electrolyte with the ratio of cadmium to nickel of about 10 to 1, said electrolyte containing ammonium sulfate in sufficient concentration to maintain the pH in the range of about 5 to about 8;
    (b) inserting anodes and a cathode in said electrolyte, the anodes comprising cadmium anodes, activated nickel anodes and inactive gassing nickel anodes, said inactive gassing anodes being placed between said cadmium anodes and said activated nickel anodes;
    (c) electroplating cadmium on said cathode in an unagitated electrolyte at a cathode current density ranging from about 1 to about 2 amperes/in.$^2$ of cathode, continuing said electroplating for a time corresponding to about 0.25 ampere-hour/in.$^2$ of unplated cathode;
    (d) removing the cadmium active material from the cathode;
    (e) washing and drying said cadmium active material in such a manner as to prevent its oxidation; and recovering a stable cadmium metal which has good electrochemical activity when used to prepare electric storage battery electrodes.

3. An electrolytic process for preparing electrochemically active cadmium which comprises:
    (a) preparing an aqueous sulfate electrolyte containing cadmium sulfate and nickel sulfate in sufficient concentration to provide a cadmium concentration of at least about 20 grams per liter of electrolyte with the ratio of cadmium to nickel of about 10 to 1, said electrolyte containing ammonium sulfate in sufficient concentration to maintain the pH of the electrolyte in the range of about 5 to 8;
    (b) inserting anodes and a cathode in said electrolyte, the anodes comprising cadmium anodes, activated nickel anodes and inactive gassing anodes;
    (c) electroplating cadmium on said cathode in an agitated electrolyte which is maintained at about room temperature by cooling means, and at a cathode current density ranging from about 20 to about 30 amperes/in.$^2$ of cathode, continuing said electroplating for a time corresponding to about 0.25 ampere-hour/in.$^2$ of unplated cathode;
    (d) removing the cadmium active material from the cathode;
    (e) washing and drying said cadmium active material in such a manner as to prevent its oxidation; and
    (f) recovering a stable cadmium metal which has good electrochemical activity when used to prepare electric storage battery electrodes.

References Cited

UNITED STATES PATENTS

| | | | |
|---|---|---|---|
| 1,194,438 | 8/1916 | Stevens | 204—1.05 XR |
| 1,509,138 | 9/1924 | Graffenberg | 136—241 XR |
| 1,754,125 | 4/1930 | Smith | 204—112 |
| 2,115,019 | 4/1938 | Growningsaeter | 204—112 XR |
| 3,276,921 | 10/1966 | Freeman | 148—31.55 |
| 3,326,721 | 6/1967 | Henderson et al. | 136—24 |

FOREIGN PATENTS

| | | |
|---|---|---|
| 9,964 | 1910 | Great Britain. |
| 143,327 | 5/1920 | Great Britain. |

HOWARD S. WILLIAMS, *Primary Examiner.*

W. VAN SISE, *Assistant Examiner.*